BOREHOLE TOOL ROTATIONAL SWITCHING SYSTEM CONTROLLED BY DETECTOR OF EARTH'S MAGNETIC FIELD

Filed Feb. 23, 1966 2 Sheets-Sheet 1

INVENTORS:
JAMES H. SEXTON
BOBBIE J. PATTON
ATTORNEY:
Arthur F. Zobal

INVENTORS:
JAMES H. SEXTON
BOBBIE J. PATTON
ATTORNEY:
Arthur F. Zobal

United States Patent Office 3,400,327

Patented Sept. 3, 1968

3,400,327

BOREHOLE TOOL ROTATIONAL SWITCHING SYSTEM CONTROLLED BY DETECTOR OF EARTH'S MAGNETIC FIELD

James H. Sexton and Bobbie J. Patton, Dallas, Tex., assignors to Mobil Oil Corporation, a corporation of New York Filed Feb. 23, 1966, Ser. No. 529,364
11 Claims. (Cl. 324—8)

ABSTRACT OF THE DISCLOSURE

The specification discloses a magnetic field detecting means rotatably secured within a drill pipe for detecting the earth's magnetic field upon rotation of the drill pipe for controlling the switching of instrumentation located within the pipe. In the embodiment disclosed, the sensing means comprises an electrical coil, the output of which is applied to a frequency discriminating system for producing a control signal for application to the instrumentation only when the drill pipe is rotating within a predetermined frequency range.

This invention relates to a system for activating borehole instrumentation during drilling to carry out desired operations and more particularly to an activating system controlled by rotation of a drill pipe casing.

In borehole drilling, it is desirable to perform certain borehole operations while drilling, such as marking cores taken from the subsurface formations, for orientation purposes. Operations of this type require the use of downhole electrical instrumentations located in the drill pipe casing, preferably powered by an independent downhole power supply, such as batteries.

In certain operations, it may be desirable to maintain the borehole instrumentation inactive during the time that the drill pipe is being lowered into the borehole, and further to activate the instrumentation only during certain times or under certain conditions after drilling has begun. In order to fulfill these requirements, a downhole switching or activating system is needed, preferably of the type which does not require the use of extending electrical cable conductors for control purposes.

Activation may be carried out with a conventional battery powered timing device; however, devices of this type operate in accordance with a preset time schedule and hence have inherent disadvantages in drilling operations wherein the drill pipe lowering times and drilling time schedules or operating conditions vary.

In accordance with the present invention, the borehole instrumentation is activated by a downhole switching arrangement controlled by rotation of the drill pipe casing. The switching arrangement comprises means located in the casing in a section adapted to be inserted into the borehole and secured to the casing for rotation therewith. This means produces a signal, upon rotation of the casing, having characteristics dependent at least upon the frequency of rotation. In addition, a second means is provided and made responsive to the signal for producing a control signal which is applied to the instrumentation for activation thereof while drilling.

Preferably, the second means is made selectively responsive to the characteristics of the signal produced by the first means for producing the control signal only within a predetermined range of drill pipe rotational speeds. Thus, assurance can be had that activation will take place only after drilling has started.

The switching arrangement of the present invention further is very sensitive and can be adjusted to allow activation to take place over a wide range of drill pipe rotational speeds extending down to low frequencies. The switching arrangement disclosed for allowing sensitive frequency control to be exercised comprises a magnetic field sensing means for sensing the earth's magnetic field upon rotation of the drill pipe casing. Preferably, the magnetic field sensing means comprises an electrical coil secured within the casing with its axis perpendicular to the drill pipe casing. Thus, rotation of the drill pipe in the earth's magnetic field will cause an alternating signal to be induced in the coil. This signal has a frequency as well as a peak-to-peak amplitude dependent upon the frequency of rotation of the casing. Discriminating means employed is made selectively responsive to the frequency and amplitude of the alternating signal produced by the sensing means for producing the desired control signal only when the drill pipe casing is rotated within the desired frequency range.

For further objects and advantages of the invention, and for a more complete description thereof, reference may now be had to the following description taken in conjunction with the accompanying drawings in which.

Figure 2:
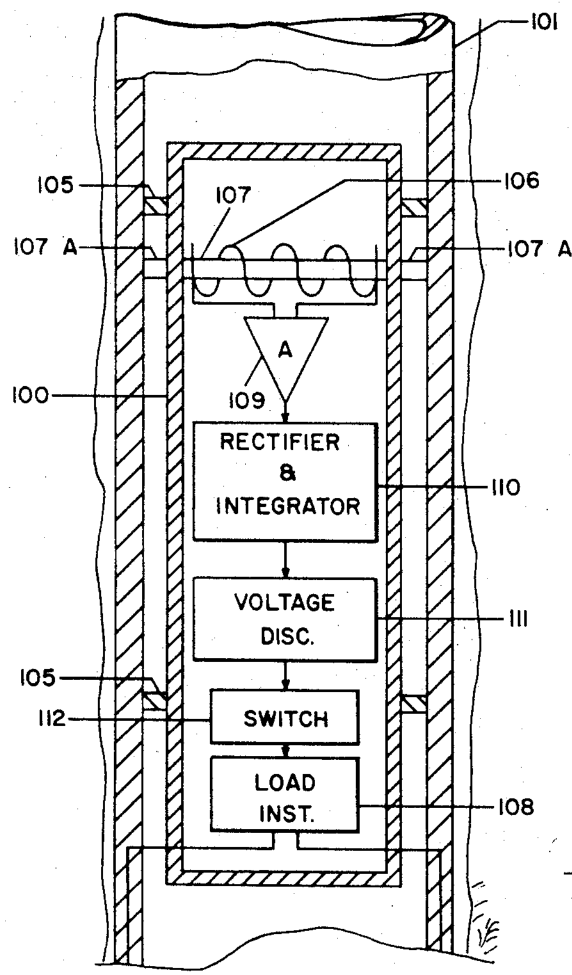
FIGURE 2 illustrates a surface power system for rotating drill pipe.
Figure 2:
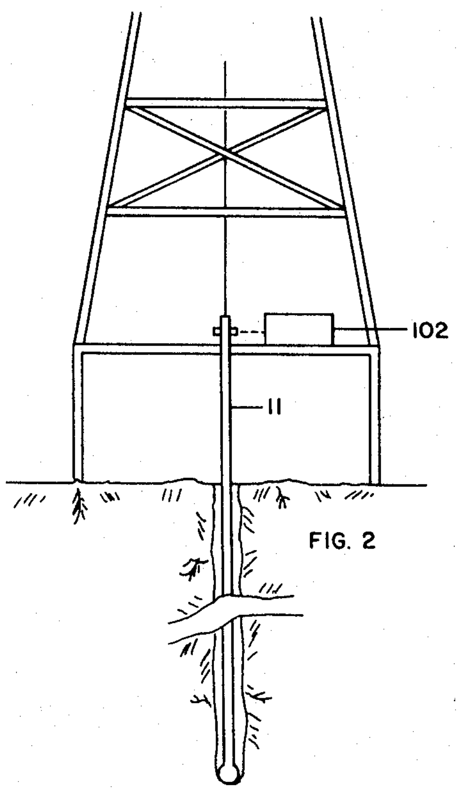
Figure 1:
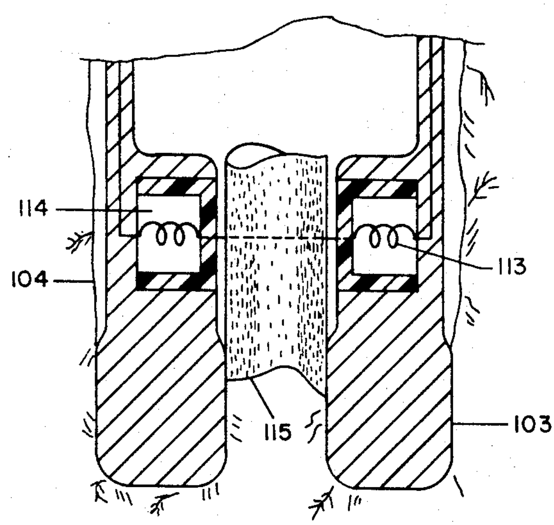
FIGURE 1 illustrates partially in block diagram the borehole switching system of the present invention.

Referring now to FIGURE 1, there will be described the borehole rotational switching system of the present invention. This system is located in a sealed container 100 secured to the interior of a rotatable drill pipe casing 101. The casing is driven rotatably by a surface power means 102 (FIGURE 2) and further has a drill bit 103 coupled to the lower end thereof for drilling or carrying out drilling operations (such as coring) in the borehole 104. Rodlike supports 105 secure the container 100 to the interior of the casing wall in a spaced manner to allow the container 100 to be rotated with the casing 101 and further to allow drilling fluid to pass between the container 100 and the casing wall.

The rotational switching system comprises a magnetic field sensing coil 106 wound upon an iron core 107 having its axis secured perpendicular to the container wall. Rotation of the casing 101 thus causes the coil 106 to be rotated in the earth's magnetic field whereby an alternating signal is induced in the coil. This signal is employed to activate, when drilling, load instrumentation 108, a portion of which is shown located in the container 100.

In the embodiment disclosed, discriminating circuitry comprising amplifier 109, rectifying an integrating circuit 110, and voltage discriminator 111 are coupled to the output of coil 106 for obtaining sensitive rotational frequency control for activating the instrumentation 108. This discrimination circuitry produces a control signal from the coil signal only when the frequency of rotation of the coil 106 and hence casing 101 falls within a predetermined frequency range. This control signal in turn controls a switch 112 for controlling the load instrumentation 108. Upon drilling, the instrumentation 108 is activated or turned on by the control signal produced when the drill pipe rotational frequency exceeds the lower limit of the predetermined frequency range. If the drill pipe rotational frequency exceeds the upper limit or subsequently falls below the lower limit, production of the control signal is terminated and instrumentation 108 is inactivated or turned off.

The coil signal amplitude and frequency are utilized by the discriminating circuitry for producing the control signal in the rotational frequency range of interest. More particularly, the frequency and amplitude of the signal induced in the coil 106 both are dependent upon the frequency of rotation of the casing 101 and hence of the coil 106, in the earth's magnetic field. Mathematically this signal may be expressed as:

$$e_r \propto 10^{-8}\omega NAH_e \sin \omega$$

where:

$\omega$=angular velocity,
$NA$=area turns of coil,
$t$=elapsed time, and
$H_e$=horizontal component of earth's field.

Amplifier 109 is employed to pass only low frequency signals from the coil 106 and hence determines the upper limit of rotational frequency at which the control signal will be produced. The output of the amplifier 109 is applied to rectifying and integrating circuit 110 for producing a DC signal. This DC signal has an amplitude dependent upon the peak-to-peak amplitude of the alternating signal produced by the coil 106 and hence is dependent upon the frequency of rotation of the coil 106 and casing 101. Voltage discriminator 111 is made responsive to the DC signal amplitude to produce an output only when the DC signal amplitude rises above a predetermined threshold level. The discriminating circuitry thus is made selectively responsive to the casing rotational frequency and produces an output from voltage discriminator 111 only when the frequency of rotation of the coil 106 and casing 101 falls within the desired frequency range.

In one embodiment, the borehole load instrumentation 108 may comprise a load coil circuit for producing an alternating magnetic field in the presence of the earth's magnetic field for imparting anhysteretic remanent magnetism to a subsurface core sample, as disclosed in U.S. Patent No. 3,088,528. In this embodiment, the load coil is illustrated at 113 and is shown located outside the container 100 in a sealed lower section 114 of the drill bit 103. Upon drilling, a core 115 is formed which passes adjacent to the coil 113 and to a core barrel (not shown). The coil 113 is activated to produce the alternating magnetic field which is seen by the core 115, as it continuously moves past the coil 113 as a decaying magnetic field. Thus, anhysteretic remanent magnetism aligned in the direction of the earth's magnetic field is imparted to the core which is employed subsequently for orientation purposes. In a further alternative, the load instrumentation 108 may include a timing device (not shown), activated by the rotational switching system only when drilling operations begin, to activate periodically the coil 113 while drilling to produce the decaying and alternating magnetic field.

In a further embodiment, anhysteretic remanent magnetism may be imparted to a synthetic substance employed, for example, for determining the deviation of a borehole tool from vertical, while drilling, as disclosed in copending U.S. application Ser. No. 529,357, filed Feb. 23, 1966, by John L. Fitch and Bobbie J. Patton, and assigned to the same assignee as the present invention. In this embodiment, the load instrumentation as well as the synthetic substance, are located within the container 100. The load instrumentation also includes a coil for producing and imposing a decaying and alternating magnetic field to the synthetic substance in the presence of the earth's magnetic field. Thus, anhysteretic remanent magnetism aligned in the direction of the earth's magnetic field is imparted to the substance. Since the position of the synthetic substance in the casing container is known, subsequent measurements of the magnetism imparted to the substance allows one to determine deviation of the casing from vertical.

In the embodiment mentioned above, wherein anhysteretic remanent magnetism is imparted to a core taken while drilling, the discriminating circuitry is adjusted or constructed to activate the load instrumentation at a rotational frequency range, beginning at a lower limit of about one-half cycle per second and extending to an upper limit of about seven cycles per second.

Figure 3:
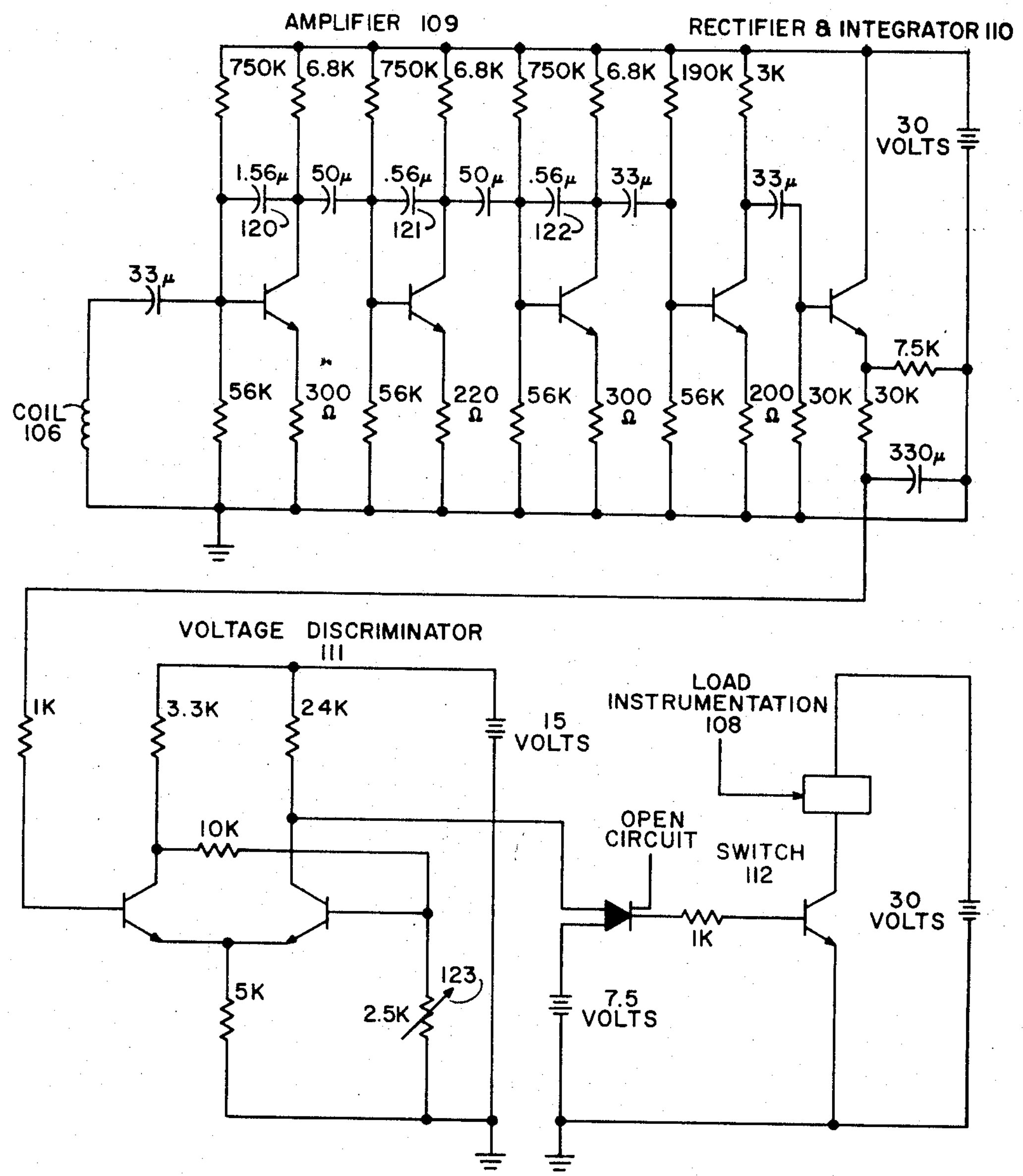
FIGURE 3 illustrates the circuitry of the borehole system of FIGURE 1.

Referring now to FIGURE 3, there will be described in detail the circuitry of FIGURE 1 which allows activation to be carried out over the desired frequency range of interest including low frequencies mentioned above. In this figure, the symbol $\mu$ denotes microfarads, the symbol K denotes kilohms, and the symbol $\Omega$ denotes ohms.

The magnetic field sensing coil is illustrated at 106. The amplifier 109 consists of four stages of amplification. Negative feedback by way of capacitators 120–122 is employed to attenuate significantly all frequencies above about 10 cycles per second. This attenuation reduces significantly all noise above this frequency including 60 cycles per second which may otherwise present problems. When the coil is rotating at about one-half cycle per second in the earth's field, the output of the amplifier is about 10.5 volts peak-to-peak. As the frequency of rotation of the coil is increased to two cycles per second, the output is 25 volts. Above seven cycles per second, the output drops rapidly with increase in frequency due to the large amount of negative feedback.

The rectifier of circuit 110 comprises a single stage emitter follower which functions as a half wave rectifier. The output of the emitter follower is applied to an RC integrating circuit for producing the DC signal having an amplitude dependent upon the frequency of rotation of the casing 101.

The voltage discriminator 111 comprises a Schmitt trigger circuit which functions in such a manner that it will not produce output until the DC voltage from the integrating network exceeds a certain reference voltage. By measuring the DC voltage output of the integrating circuit as a function of the rotational frequency of the coil 106, adjustments can be made with respect to the reference voltage of the voltage discriminator to correspond to a certain threshold frequency of the rotation of coil 106. Adjustments can be carried out, for example, by means of control 123. Thus, the voltage discriminator will exhibit an output only when the frequency of rotation of the coil 106 exceeds the lower threshold frequency which may be as low as one-half cycle per second.

The switch 112 comprises a silicon controlled switch which activates the base of a transistor causing the transistor to saturate. When activated, the switch supplies power to the borehole load instrumentation 108 for activation thereof. The switch 112 is activated only when there is an output from the voltage discriminator 111 which in turn exhibits an output only when the frequency of rotation of the coil 106 falls within the selected frequency range.

In the embodiment disclosed, the pole pieces of the iron core 107 are secured tightly against the walls of the container 100. Additional magnetic pole pieces 107a are secured between container 100 and the casing 101. The container 100 and casing 101 in the vicinity of the coil 106 and the pole pieces are of magnetic material whereby a low reluctance path is provided. The casing 101 in the vicinity of the coil 113, as well as the drill bit 103, are made of nonmagnetic material.

Having described the invention, it will be understood that modifications may suggest themselves to those skilled in the art, and it is intended to cover all those that fall within the scope of the appended claims.

What is claimed is:

1. In a borehole apparatus having a rotatably driven casing coupled to a drill bit adapted for insertion into a borehole, the combination therewith of:

instrumentation for carrying out desired operations upon rotation of said casing in said borehole, said instrumentation being located within said casing in a section adapted for insertion into said borehole, magnetic field sensing means located in said section of said casing for sensing the earth's magnetic field for the production of an alternating signal having characteristics dependent at least upon the frequency of rotation of said casing, and control means coupled to said sensing means and to said instrumentation, said control means being selectively responsive to said characteristics of said signal for producing a control signal for application to said instrumentation for activation thereof only when the frequency of rotation of said casing within said borehole is above a predetermined lower frequency limit.

2. The system of claim 1 wherein:

said control means is selectively responsive to said characteristics of said signal for producing a control signal for application to said instrumentation for activation thereof only when the frequency of rotation of said casing within said borehole is within a predetermined frequency range having a lower limit and an upper limit.

3. The system of claim 2 wherein:

said sensing means is coupled to said casing for rotation therewith.

4. The system of claim 3 wherein:

said sensing means comprises an electrical coil whose axis is located substantially perpendicular to the axis of said section of said casing.

5. The system of claim 4 wherein:

said coil produces a varying signal having a magnitude and frequency dependent upon the frequency of rotation of said casing, said control means being selectively responsive to the frequency and amplitude of the signal produced by said coil for producing said control signal only when the rotation of said casing is within said predetermined frequency range.

6. The system of claim 2 wherein:

said control means significantly attenuates all signal components above said upper limit, said upper limit being below 60 cycles per second.

7. The system of claim 2 wherein:

said instrumentation includes an electrical coil for imparting anhysteretic remanent magnetism to a member.

8. The system of claim 7 wherein:

said drill bit is adapted to obtain a core from the formations upon rotation of said drill bit, said predetermined frequency range beginning at a lower limit of about one-half cycle per second and extending to an upper limit of about seven cycles per second.

9. In a borehole drilling apparatus, the combination comprising:

casing means coupled to a drill bit adapted for insertion into a borehole, means at the surface for rotatably driving said casing means and said drill bit, electrical instrumentation for carrying out desired operations upon rotation of said casing means in said borehole, said instrumentation being located within said casing means in a section adapted for insertion into said borehole, magnetic field sensing means located in said section of said casing means, said sensing means being coupled to said casing means for rotation therewith for sensing the earth's magnetic field for the production of an alternating signal having characteristics dependent at least upon the frequency of the rotation of said casing means, frequency discriminating means coupled to said sensing means for producing a control signal only when the frequency of rotation of said casing means within said borehole is within a predetermined frequency range, switch means coupled to said frequency discriminating means and to said instrumentation for controlling the application of electrical power to said instrumentation, said switch means being operative to apply said power to said instrumentation only when said control signal is produced by said frequency discriminating means.

10. The system of claim 9 wherein:

said sensing means comprises an electrical coil whose axis is located substantially perpendicular to the axis of said section of said casing means, said frequency discriminating means including:

filter means coupled to said coil for attenuating at least signal components above a predetermined frequency limit, rectifier and integrating means coupled to the output of said filter means for producing a D-C signal having an amplitude dependent upon the peak-to-peak amplitude of said alternating signal produced by said coil, and threshold means coupled to the output of said integrating means for producing an output only when said D-C signal amplitude rises above a predetermined threshold level, the output of said threshold means being coupled to said switch means.

11. In a borehole apparatus having a rotatably driven member coupled to a drill bit adapted for insertion into a borehole, the combination therewith of:

electrical instrumentation for carrying out desired operations upon rotation of said member in said borehole, said instrumentation being coupled to said member to a section adapted for insertion into said borehole, magnetic field sensing means coupled to said section of said member for sensing the earth's magnetic field for the production of an alternating electrical signal having characteristics dependent at least upon the frequency of rotation of said member, and electrical control means coupled to said section of said member, said control means being coupled electrically to said magnetic field sensing means and to said instrumentation, said control means being selectively responsive to said characteristics of said signal for producing an electrical control signal for application to said instrumentation for activation thereof only when the frequency of rotation of said member within said borehole is within a predetermined frequency range having a lower limit and an upper limit.

References Cited

UNITED STATES PATENTS

| | | | |
|---|---|---|---|
| 2,300,823 | 11/1942 | Whitman. | |
| 2,370,818 | 3/1945 | Silverman | 324—10 XR |
| 2,940,039 | 6/1960 | Yost et al. | 324—70 |
| 2,958,821 | 11/1960 | Webb | 324—70 |
| 2,958,511 | 11/1960 | Pfefferle | 324—70 |
| 3,032,127 | 5/1962 | Kenney et al. | 175—44 |
| 3,297,948 | 1/1967 | Kohler | 324—70 |

RUDOLPH V. ROLINEC, *Primary Examiner.*

G. R. STRECKER, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,400,327 September 3, 1968

James H. Sexton et al.

It is certified that error appears in the above identified patent and that said Letters Patent are hereby corrected as shown below:

Column 3, line 3, "$e_r \propto 10^{-8} \omega N A H_e \sin \omega$" should read -- $e_r \propto 10^{-8} \omega N A H_e \sin \omega t$ --.

Signed and sealed this 20th day of January 1970.

(SEAL)
Attest:

Edward M. Fletcher, Jr.
Attesting Officer

WILLIAM E. SCHUYLER, JR.
Commissioner of Patents